United States Patent [19]

Iida et al.

[11] Patent Number: 5,469,419
[45] Date of Patent: Nov. 21, 1995

[54] INFORMATION PROCESSING APPARATUS WITH RECORDING MEDIUM DISCHARGING MECHANISM FOR PREVENTING CHANGE OR LOSS OF INFORMATION OF RECORDING MEDIUM BY TEMPERATURE INCREASE OF THE APPARATUS

[75] Inventors: Ichiro Iida, Tokyo; Yoshitaka Ogino, Kawasaki; Hideo Nakajima, Yokohama, all of Japan

[73] Assignee: Canon Kabushiki Kaisha, Tokyo, Japan

[21] Appl. No.: 376,668

[22] Filed: Jan. 23, 1995

Related U.S. Application Data

[63] Continuation of Ser. No. 104,392, Jul. 15, 1993, abandoned, which is a continuation of Ser. No. 500,568, Mar. 28, 1990, abandoned.

[30] Foreign Application Priority Data

Dec. 15, 1989 [JP] Japan ..................................... 1-325002

[51] Int. Cl.⁶ ................................................. G11B 7/00
[52] U.S. Cl. ............................. 369/58; 369/13; 360/97.02
[58] Field of Search ................................. 369/58, 50, 32, 369/124, 33, 34, 13; 360/77.02, 97.03, 105, 99.02, 99.06, 69, 99.03, 99.05, 99.06, 99.07, 114, 97.04

[56] References Cited

U.S. PATENT DOCUMENTS

| | | | |
|---|---|---|---|
| 3,753,254 | 8/1973 | Ruble et al. | 360/77.02 |
| 4,056,831 | 11/1977 | Godbout et al. | 360/77.02 |
| 4,811,052 | 3/1989 | Yamakawa et al. | 355/14 C |
| 4,905,042 | 2/1990 | Tanaka et al. | 355/56 |
| 4,923,285 | 5/1990 | Ogino et al. | 350/331 T |
| 5,041,931 | 8/1991 | Uno et al. | 360/97.03 |

FOREIGN PATENT DOCUMENTS

| | | |
|---|---|---|
| 56-016957 | 2/1981 | Japan . |
| 57-113462 | 7/1982 | Japan . |
| 62-236173 | 10/1987 | Japan . |
| 63-237227 | 10/1988 | Japan . |
| 63-241728 | 10/1988 | Japan . |
| 01196732 | 8/1989 | Japan . |

*Primary Examiner*—Aristotelis Psitos
*Assistant Examiner*—Thang V. Tran
*Attorney, Agent, or Firm*—Fitzpatrick, Cella, Harper & Scinto

[57] ABSTRACT

The present invention relates to an information processing apparatus for effecting information recording and/or reproduction on a recording medium loaded in the apparatus. The information processing apparatus comprises a detector for detecting the temperature of the medium and a medium discharging device for discharging the medium from the apparatus when the temperature detected by the detector exceeds a predetermined value so as to prevent change or loss of information recorded on the medium due to temperature increase of the apparatus. The information processing apparatus may further include a control device for suspending the discharge of the medium even when the detected temperature exceeds a predetermined value in the course of a recording or erasing operation, but discharging the medium in case a next operation is not started within a predetermined time after the end of the above operation.

14 Claims, 6 Drawing Sheets

INFORMATION PROCESSING APPARATUS WITH RECORDING MEDIUM DISCHARGING MECHANISM FOR PREVENTING CHANGE OR LOSS OF INFORMATION OF RECORDING MEDIUM BY TEMPERATURE INCREASE OF THE APPARATUS

This application is a continuation of application Ser. No.08/104,392, filed Jul. 15, 1993, now abandoned, which was a continuation of application Ser. No. 07/500,568, filed Mar. 28, 1990, now abandoned.

BACKGROUND OF THE INVENTION

1. Field of the Invention

The present invention relates to an information processing apparatus for information recording, reproduction and/or erasure by a recording medium loaded in the apparatus, and more particularly to such an apparatus for preventing the change or loss of information by monitoring the temperature of said recording medium.

2. Related Background Art

In recent years there have been active developments of optical information processing apparatus for high-density information recording or reproduction by irradiating an optical recording medium with a light beam. Among such optical recording media, there are already known, for example, so-called WORM (write-once-read-mostly) recording medium, capable of add-on only once, and an erasable recording medium utilizing a magnetooptical recording method or physical phase change. In the following there will be explained the method of information recording and reproduction, as an example, in case of a magnetooptical disk.

The magnetooptical disk is composed of a thin magnetic film formed on a substrate and having an easy direction of magnetization perpendicular to the plane of film, and records information by the change in the direction of magnetization of said thin magnetic film. During information recording, the magnetization of said thin magnetic film is aligned in advance in a direction, and said film is irradiated with a laser beam modulated digitally according to the information signal, under the application of a bias magnetic field of a direction opposite to the direction of said magnetization. Thus the area irradiated by the laser beam is heated close to the Curie temperature whereby the coercive force of said area is reduced, and said area is magnetized, by the influence of said bias magnetic field, in a direction opposite to the direction of magnetization of the surrounding area. Thus a magnetized pattern is formed according to the information. The information thus recorded can be optically read, by the well known magnetooptical effect, by irradiating the medium with a low-power unmodulated light beam. Said information can also be erased by applying a magnetic field of a direction opposite to that of the bias magnetic field at the information recording.

On the other hand, the above-mentioned recording media, particularly the magnetooptical recording medium, give rise to change or erasure of recorded information by a change in the materials themselves, if the medium exceeds a certain temperature. For this reason, the conventional apparatus are so designed to detect the temperature of the recording medium and to reduce the irradiating laser power if the detected temperature exceeds a certain value, thereby protecting the recorded information.

However, even in such conventional apparatus capable of monitoring the temperature of the medium, the recorded information may be changed or lost if the medium is merely placed in the apparatus in case the temperature increases further, even in the absence of the laser beam.

SUMMARY OF THE INVENTION

In consideration of the foregoing, an object of the present invention is to provide an information processing apparatus capable of securely protecting the recorded information even when the temperature of the medium is elevated.

Another object of the present invention is to provide an information processing apparatus capable of securely protecting the recorded information without hindering a continuous recording and/or erasing operation, even when the temperature of the medium is elevated in the course of a recording and/or erasing operation.

The foregoing objects can be attained, according to the present invention, by an information processing apparatus for effecting information recording and/or reproduction with a recording medium loaded in said apparatus, by providing means for detecting the temperature of said medium and means for discharging said medium from the apparatus according to the result of detection by said detecting means; or by an information processing apparatus for effecting information recording and/or erasing with a recording medium loaded in said apparatus, by providing means for detecting the temperature of said medium, means for discharging said medium from the apparatus when the detected temperature exceeds a predetermined value, and control means suspending the discharge of said medium when the detected temperature exceeds a predetermined value in the course of a recording or erasing operation, but discharging said medium in case a next operation is not started within a predetermined time after the end of the above-mentioned operation.

BRIEF DESCRIPTION OF THE DRAWINGS

FIG. 7($a$–$d$) is a view showing an ordinary data recording state and a state of interrupted recording.

DESCRIPTION OF THE PREFERRED EMBODIMENTS

Now the present invention will be clarified in detail by embodiments thereof shown in the attached drawings.

Figure 1:
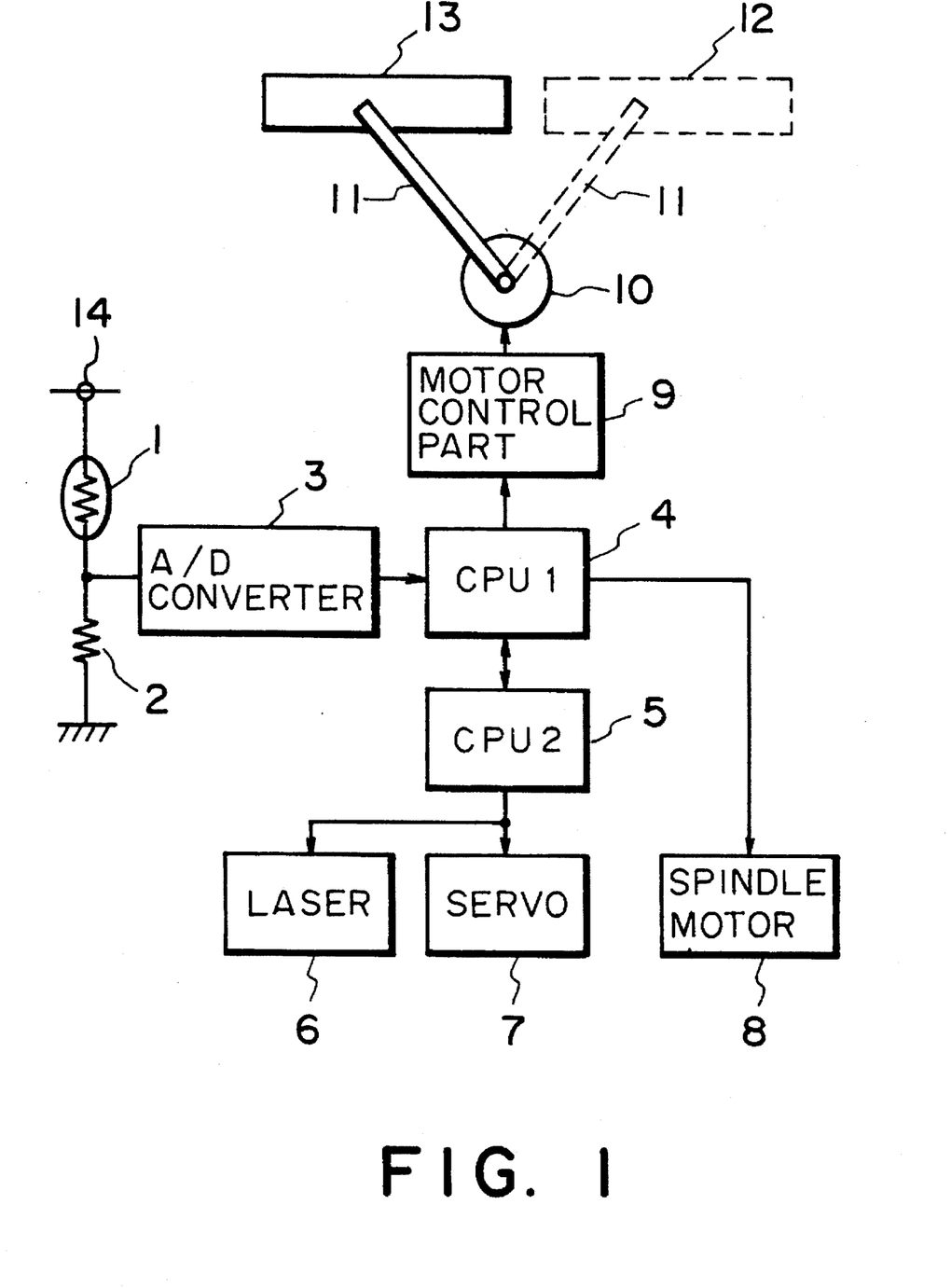
FIG. 1 is a schematic view of a first embodiment of the information processing apparatus of the present invention.

FIG. 1 is a schematic view of a magnetooptical record/reproducing apparatus, constituting a first embodiment of the information processing apparatus of the present invention. In FIG. 1 there are shown a thermistor 1 for temperature detection; a resistor 2 for converting the temperature-dependent change in resistance of the thermistor 1 into a voltage; an A/D converter 3; a first CPU 4 for sequence control; a second CPU 5 for controlling the laser unit and the servo system; a laser unit 6; a servo system 7; a spindle motor unit 8; a control unit 9 for a medium discharging motor; a medium discharging motor 10; a crank rod 11 for medium driving; a medium 12 loaded in the apparatus; a medium 13 discharged from the apparatus; and a power source 14.

Figures 2A, 2B:
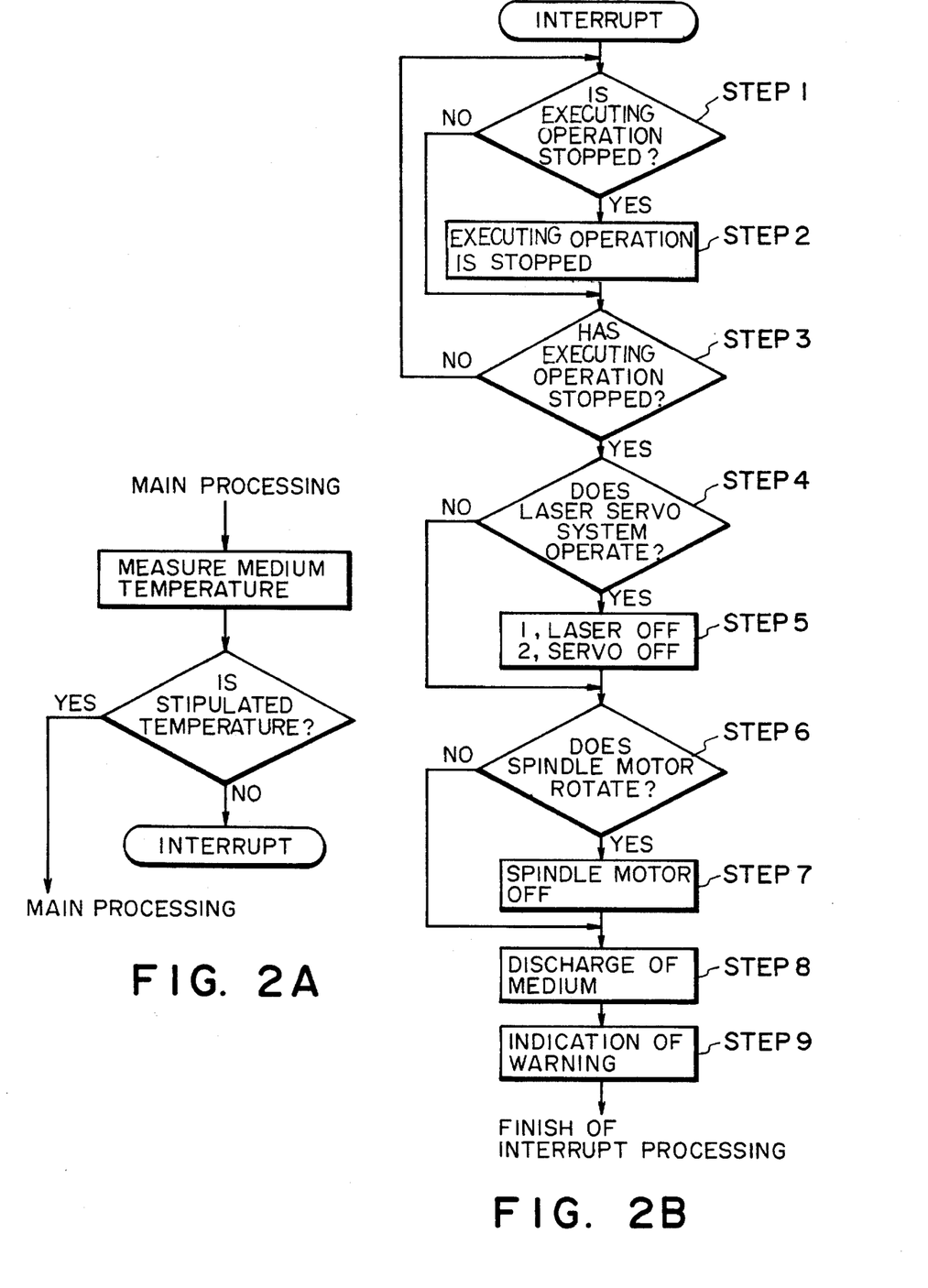
FIGS. 2A and 2B are flow charts of the function of the apparatus shown in FIG. 1.

FIGS. 2A and 2B show the sequences of temperature detection, suspension of the operation in progress, and discharge of the medium.

The temperature of the medium is measured, as shown in FIG. 2A, in a main program.

The temperature of the medium, employed in the present invention (including the second embodiment to be explained later) means the temperature in the vicinity of the medium.

At first the temperature-dependent change in resistance of the thermistor is taken out as a voltage across the converting resistor 2, and is supplied to the A/D converter 3. The sequence control CPU 4 identifies the temperature of the medium from the output data of the A/D converter 3. In the main program, the above-mentioned medium temperature is compared with predetermined temperature data set in the program, and, if the former exceeds the latter, the sequence proceeds to an interruption program.

Said predetermined temperature is selected higher than the normal temperature in the apparatus but lower than the information destructing temperature at which the change or loss of recorded information takes place.

FIG. 2A is a flow chart of the interruption program, in which a step 1 discriminates whether the medium is at a temperature immediately causing destruction of the recorded information, and, if the possibility of destruction of recorded information exists, the sequence proceeds to a step 2 to immediately interrupt the operation currently in progress. Otherwise the sequence proceeds to a step 3 for awaiting the completion of the operation currently in progress.

After the operation in progress is interrupted or completed, a step 4 discriminates the drive state of the laser unit and the servo system. If the laser unit is active, a step 5 causes the sequence control CPU 4 to send a laser stop command to the laser/servo control CPU 5 thereby deactivating the laser unit 6.

Also if the step 4 identifies that the servo system is active, a servo stop command is sent to deactivate the servo system 7, as in the case of the laser unit.

A step 6 discriminates the drive state of the spindle motor, and, if it is active, the sequence control CPU 4 stops the spindle motor 8 in a step 7.

If the sequence control CPU 4 recognizes, in the steps 4 to 7, that the medium is in a dischargeable state, a step 8 executes the discharge of the medium by a medium discharge command from the sequence control CPU 4 to the motor control unit 9. In response to said command, the motor control unit 9 activates the motor 10 and discharges the medium by the crank rod 11. The change or loss of information of the recording medium can be prevented by the above-explained operation. However, the following operations are added for safety. In a step 9, the sequence control CPU provides to the user, a warning that the temperature of the medium has exceeded a predetermined value, by the light of an LED or the sound of a buzzer. In response to said warning, the user moves the ejected medium to a position distant from the apparatus, thereby securely preventing the change or loss of information on the recording medium.

The discharge of the recording medium in the foregoing first embodiment is achieved by the discharging motor 10 and the medium driving crank rod 11, but such structure is not limitative and there may be employed, for example an ejecting mechanism used in the ordinary ejection of the recording medium.

In the following there will be explained a second embodiment of the present invention, with reference to FIGS. 3 to 7.

Figure 3:
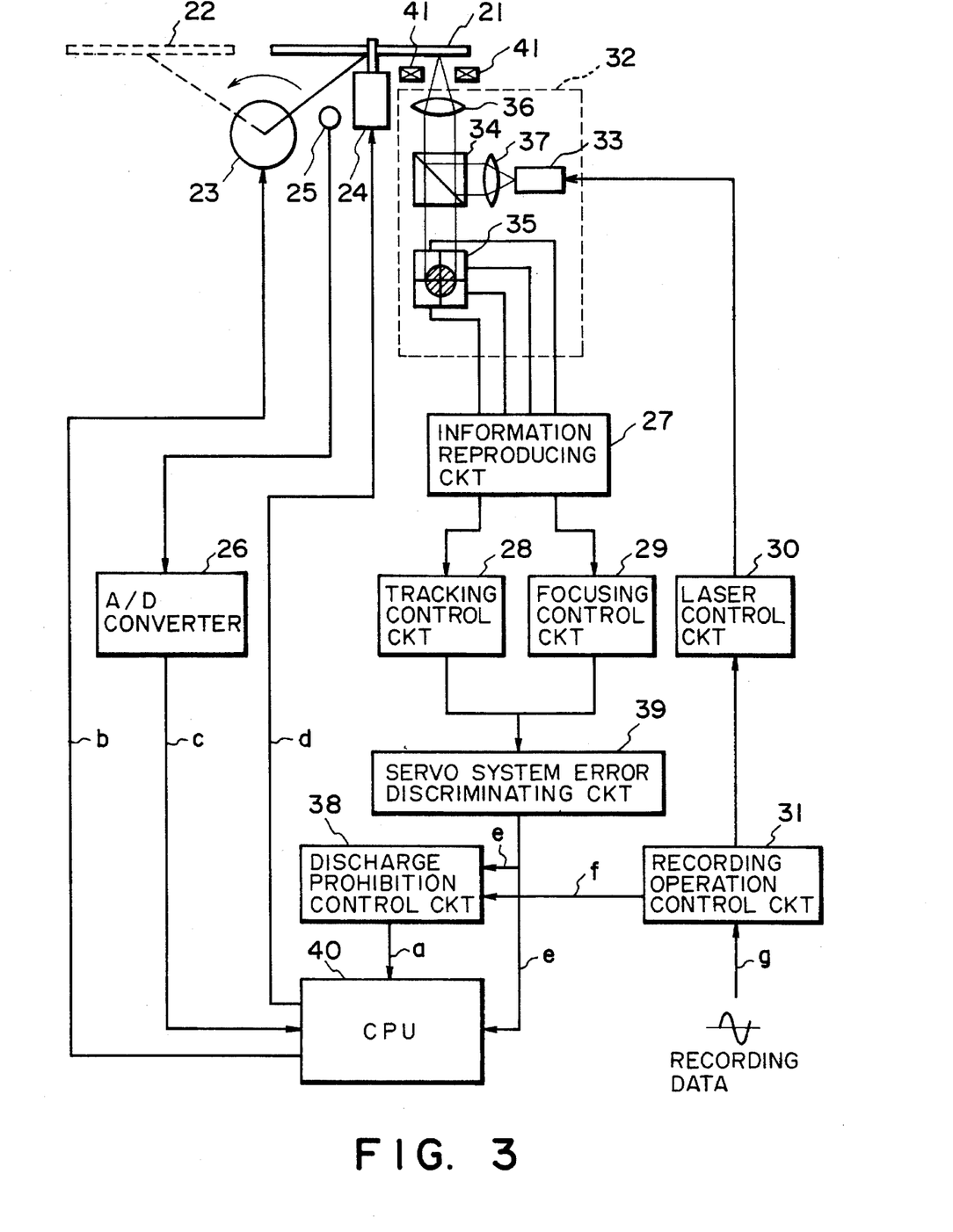
FIG. 3 is a schematic view of a second embodiment of the information processing apparatus of the present invention.
Figure 4:
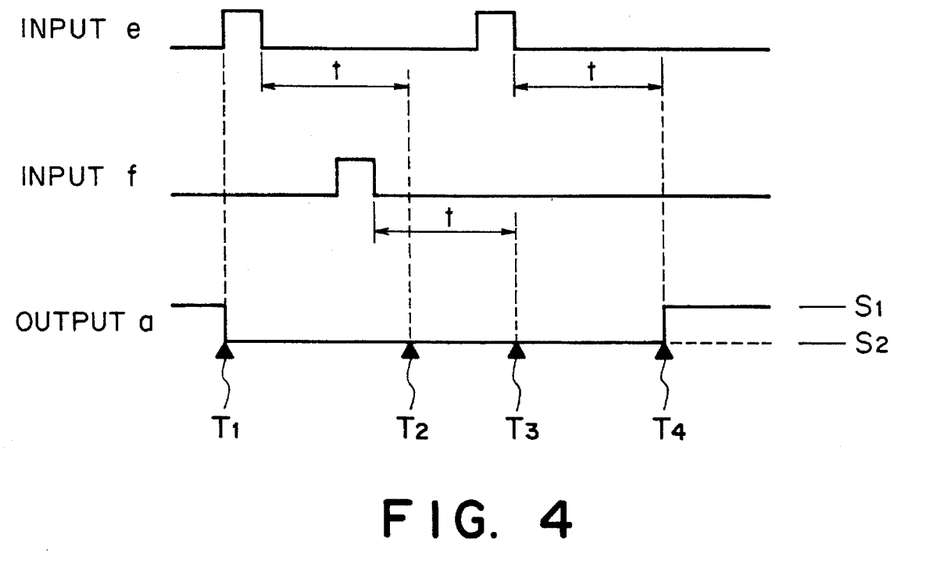
FIGS. 4, 5 and 6 are wave form charts of the signals of various parts, showing the function of the apparatus shown in FIG. 3.

FIG. 3 is a schematic view of a magnetooptical recording apparatus constituting a second embodiment of the present invention, wherein shown are a disk-shaped magnetooptical recording medium 21 loaded in the apparatus; a medium 22 in the discharged state; a medium discharging motor 23; a spindle motor 24 for rotating the medium; a thermistor 25 for detecting the temperature of the medium; an A/D converter 26 for said thermistor, for supplying the medium temperature to a central processing unit (CPU), wherein the resistor for converting the change in resistance of thermistor into voltage is not shown; an information reproducing circuit 27; a tracking control circuit 28; a focus control circuit 29; a laser control circuit 30; a recording operation control circuit 31; and an optical pickup 32. Said optical pickup 32 is composed of a laser diode 33; a half prism 34; a 4-sectored sensor 35; an objective lens 36 and a collimating lens 37. A discharge prohibition control circuit 38 for prohibiting or enabling the discharge of the medium activates an output signal a in response to the entry of an output signal e or f from a servo system error discrimination circuit 39 or a recording operation control circuit 31 as shown in FIG. 4 and maintains said output signal a for a period t after the termination of the input signal (e, f). The above-explained operation is repeated if the input signal (e, f) is entered again during said period t. The period is normally set so as to be a sufficient time for the completion of the repeat operation in case of an error occurring in the recording operation, or for the completion of the verification of the written data after the recording operation. There are further provided a servo system error discrimination circuit 39 for identifying a tracking error and a focusing error by a tracking error signal from the tracking control circuit and a focusing error signal from the focus control circuit; a CPU 40 for controlling the entire system; and a bias magnet 41 for applying a bias magnetic field.

The medium discharge control signal a varies, as shown in FIG. 4, according to the input signals e, f. Said signal a indicates, to the CPU 40, an enabled state of medium discharge at the high level ($S_1$), or a disabled state of medium discharge in the low level ($S_2$). At a time T1, the output signal a enters the discharge disabled state by the start of the input signal e. The output signal a retains the discharge disabled state in a period from T2 to T3, because of the presence of an input signal e during the period t. At a time T4, the output signal a moves to the discharge enabled state because of the absence of the input signal (e, f) during said period t.

A medium discharge motor driving signal b is supplied from the CPU 40 to the medium discharging motor 23, when the medium 21 is to be discharged from the apparatus. A medium temperature signal c, representing the temperature-dependent change in resistance of the thermistor 25, is supplied from the A/D converter 26 to the CPU 40. A spindle motor driving signal d is supplied from the CPU 40 for rotating the medium disk 21. A servo system error signal e, indicating a tracking error or a focusing error of the laser beam, in the course of a recording, reproducing or erasing operation, is sent to the CPU 40. A signal f indicating a recording operation in progress is supplied to the discharge prohibition control circuit.

In the apparatus shown in FIG. 3, the recording reproduction and erasure of information is conducted in the following manner. The medium 21 is composed of a thin magnetic film formed on a substrate and having an easy direction of magnetization perpendicular to the plane of the film, and the information is recorded by the change in the direction of magnetization of said thin magnetic film. At the recording operation, the magnetization of said thin magnetic film is aligned in advance in a direction, and said film is irradiated with a laser beam of the laser diode 33 digitally modulated according to the information signal supplied to the recording operation control circuit 31, with simultaneous application of a bias magnetic field of a direction opposite to the direction of said magnetization, by means of the bias magnet 41. Thus the area irradiated by the laser beam is heated close to the Curie temperature, whereby the coercive force is reduced, and said area is magnetized, by the influence of the bias magnetic field, in a direction opposite to that of the magnetization in the surrounding area. Thus a magnetized pattern is formed according to the information. The information thus recorded can be optically read by the well known magnetooptical effect, by irradiating the medium with a low-power unmodulated light beam. The recorded information can also be erased by the application of a magnetic field in a direction opposite to that of the bias magnetic field at the information recording operation.

In the following the function of the apparatus shown in FIG. 3 will be explained with reference to FIGS. 5 and 6.

Figure 5:
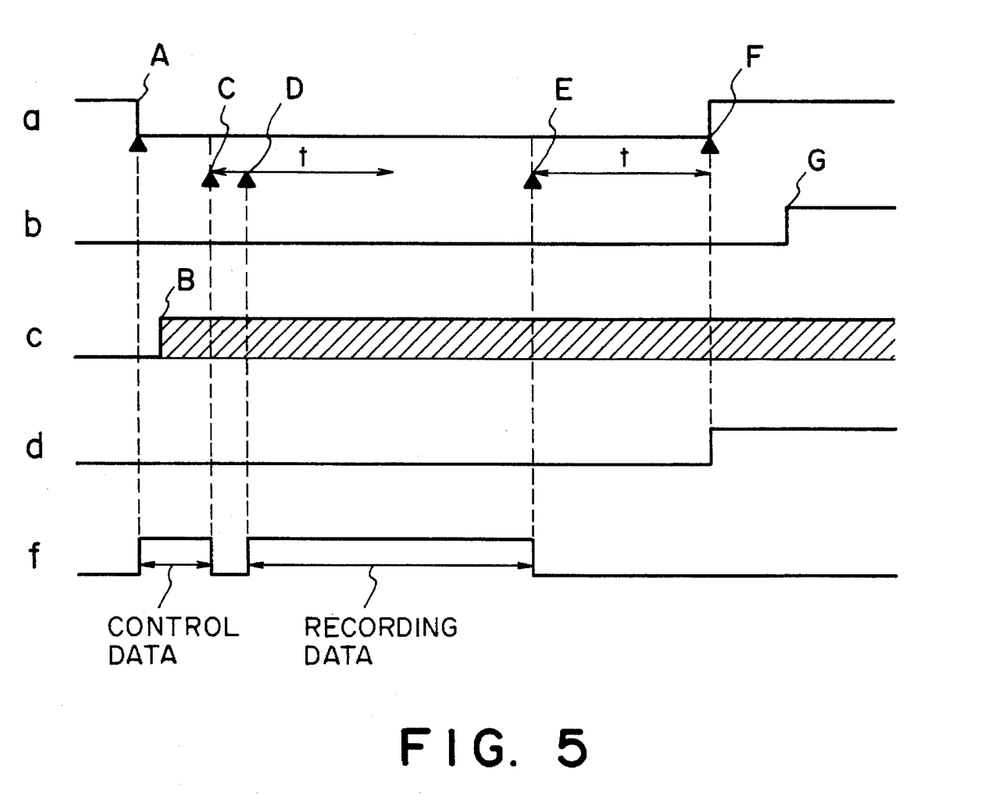

A first reference is made to FIG. 5 for explaining the function when the temperature of the medium exceeds a predetermined value in the course of a recording operation. In response to the start of entry of control data from an external upper control apparatus (not shown), the recording operation control circuit 31 activates the signal f, which is supplied to the discharge prohibition control circuit 38 for shifting the signal a to the discharge prohibition state (point A). During the recording of said control data, the CPU 40 constantly watches the temperature of the medium, by fetching the output of the thermistor 25 as the output signal c through the A/D converter 26. When the CPU 40 identifies, from the inspection of the output signal c, that the temperature of the medium is elevated beyond the predetermined value, the CPU 40 checks the state of the signal a. The medium discharging operation is not conducted since the signal a is in the discharge prohibition state. In this state the spindle motor drive signal d indicates the rotation, and the medium discharge motor driving signal b is in the inactive state. Consequently the recording operation is continued to a point C where the recording of control data is completed. At said point C, the signal f returns to the original state because the externally entered control data are terminated, but the discharge prohibition control circuit retains the discharge prohibition state for a period t after the termination of the signal f. Consequently the CPU 40 does not discharge the medium even after the recording of the control data. In the usual information recording operation, the external supply of recording data, corresponding to the preceding control data, is started within said period t, so that the signal f is again activated and the discharge prohibition control circuit 38 initiates the medium discharge prohibition state (point D). Thereafter the recording of the recording data is completed (point E), and, after the period t from the returning of the signal f to the original state, the discharge prohibition control circuit 38 shifts the signal a to the medium discharge enabled state (point F), whereupon the CPU executes the medium discharging operation, by deactivating the laser and stopping the spindle motor with the signal d (point F), and driving the medium discharging motor with the signal b, thereby discharging the recording medium (point G). Thus the medium is discharged from a position 21 to 22 shown in FIG. 3. The signal c assumes the high level state at the point B, and indicates, during the hatched period, that the temperature of the medium exceeds the predetermined value.

As in the foregoing first embodiment, said predetermined temperature is defined as data in a main program of the CPU 40, and is constantly compared in the CPU 40 with the output signal c. In the present second embodiment, said predetermined temperature is selected higher than the ordinary temperature in the apparatus but lower than the aforementioned information destruction temperature, in consideration of the eventual temperature increase during a continuous recording operation. Consequently, even when the recording or erasing operation is continued after the detection of a medium temperature exceeding said predetermined temperature, the temperature of the medium does not immediately reach said information destruction temperature and the information can be securely protected.

Figure 6:
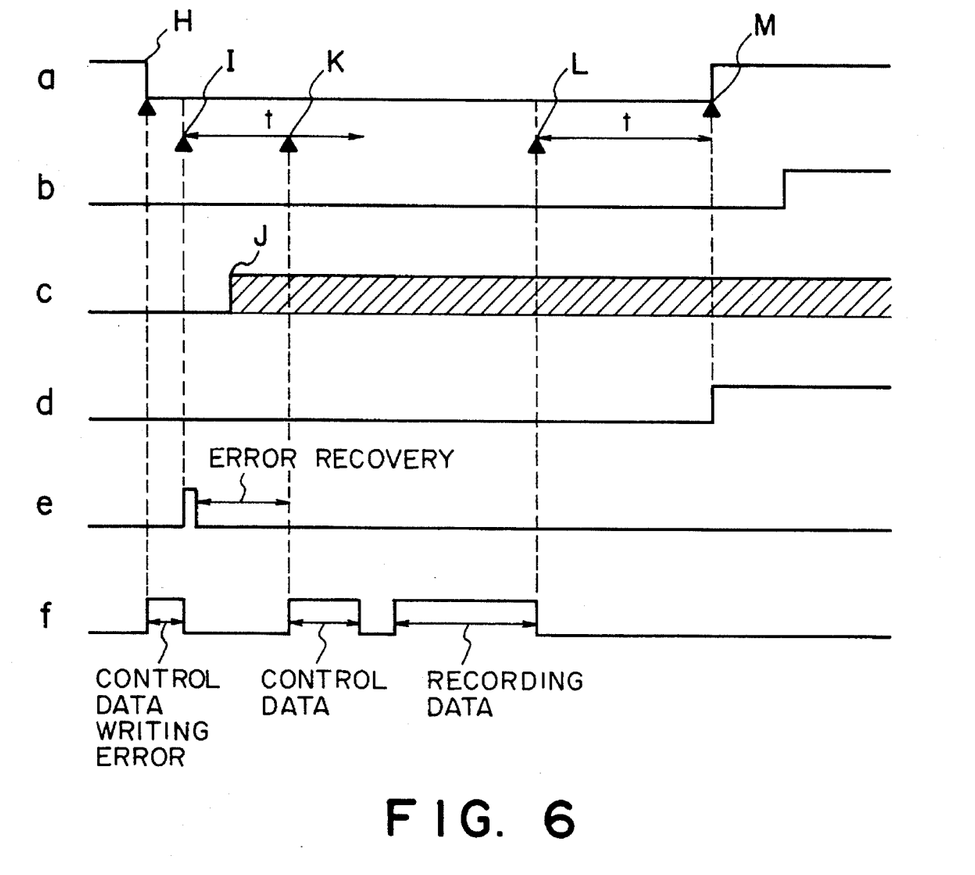

Now reference is made to FIG. 6 for explaining the function in case a temperature increase occurs in the course of recovery of recording operation from a tracking or focusing error. After the start of recording of control data (point H), the servo system error discrimination circuit 39 releases the servo system error signal e, if a tracking error or a focusing error occurs in the course of said recording. Upon detection of said signal e (point I), the CPU 40 interrupts the recording operation. Then, in response to an error recovery command from the host computer, the CPU 40 executes an error recovery operation (correction of tracking or focusing error), and thereafter restarts the recording of the control data (point K). If the temperature of the medium is elevated (point J) in the course of said error recovery operation, a servo system error signal is supplied (point I) to the CPU 40 and to the discharge prohibition control circuit 38, whereby the signal a indicates the discharge prohibition state. Consequently the CPU 40 does not execute the discharge of the medium, though the medium temperature signal c is active. The servo system error signal e is rendered active usually for a period of several hundred milliseconds, but the discharge prohibition control circuit thereafter retains the discharge prohibition state for the period t. Consequently, if the error recovery operation is completed and the recording operation is restarted within said period t, the discharge prohibition state is started again from the re-start of recording of the control data at the point K, whereby the discharge of the medium is prohibited until the signal a is shifted to the discharge enabled state (point M) after the period t from the end of recording of the recording data (point L). When the CPU 40 identifies (point M) that the signal a indicates the discharge enabled state, the CPU 40 discharges the medium from the apparatus according to the process explained before.

Thus the information recorded on the medium is securely protected.

Figure 7A:
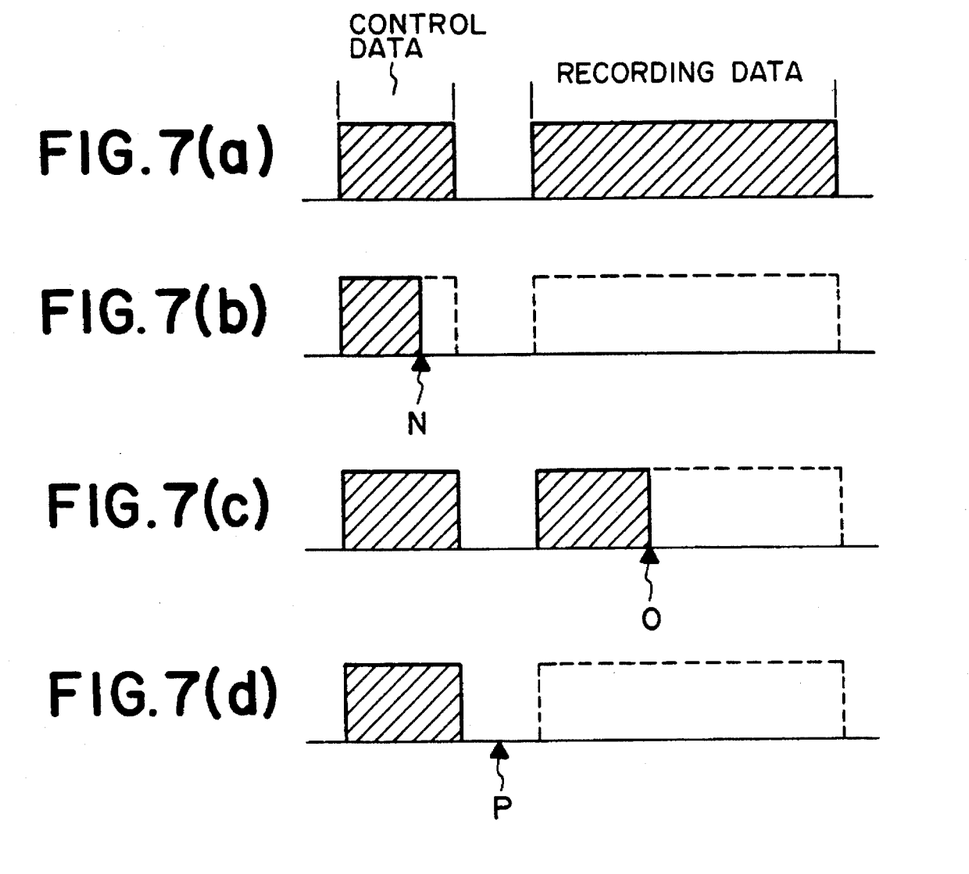

In the present second embodiment, the discharge of the medium is prohibited not only during the recording or erasing operation but also during a predetermined period after such operation, because of the following reason. In general, on the recording medium employed in the information processing apparatus, in addition to the information data, control data indicating the position (track and/or sector) of said information on the recording medium is recorded. In the actual recording operation, the control data are immediately followed by recording data as shown in FIG. 7A. However such data recording is interrupted if the medium is discharged when the temperature of the medium exceeds the predetermined value in the course of a recording operation. For example, the control data are interrupted at a point N in case of FIG. 7B, and, in case of FIG. 7C, the recording data are interrupted at a point O. Also in case of FIG. 7D, the recording is interrupted after the recording of the control data. In such case there will result a confusion in the control of recorded information, since the control data are completely recorded but the corresponding recording data are absent. Such trouble may also arise in the erasure of information. This drawback is avoided in the present invention, by prohibiting the discharge of the recording medium until the lapse of a predetermined period after the completion of recording or erasing operation. For example, in case the temperature of the medium is elevated beyond the predetermined value at a point P, as shown in FIG. 7D, immediately after the recording of the control data, the recording medium is not discharged since the recording data are entered within the predetermined period. The recording medium is discharged only if a next operation is not initiated within the predetermined period after the end of the recording of the recording data.

In addition to the foregoing embodiments, the present invention can be applied in various ways. For example, though the foregoing embodiments have been explained in relation to the recording operation, the present invention is likewise applicable to the erasing operation. Also in the foregoing embodiments, the discharge prohibition period t is selected the same after the end of the signal indicating the recording or erasing operation and after the end of the servo system error signal, but there may be selected different periods for these two cases. For example the prohibition period after the ordinary operation can be selected longer than the interval between the control data and the recording data, while the prohibition period after a servo system error may be differently selected long enough for effecting the error recovery operation. Furthermore, the present invention is applicable not only to the magnetooptical recording apparatus but also to other optical information processing apparatus or magnetic recording apparatus.

The aforementioned predetermined temperature in the first or second embodiment is preferably made variable according to the recording medium to be used, since said temperature is dependent on the kind of the recording medium. For example, data concerning the predetermined temperature may be recorded in advance on the recording medium, then read by the recording, reproducing and/or erasing light beam prior to the use of said medium, and used for automatically modifying the temperature data in the program.

What is claimed is:

1. An information processing apparatus for effecting a recording or reproducing operation for recording information on and/or reproducing information from a magnetooptical recording medium loaded in said apparatus, said apparatus comprising:

discharge means for discharging the magnetooptical recording medium from said apparatus;

detecting means for detecting a temperature in a vicinity of the magnetooptical recording medium; and control means for controlling said discharging means by judging whether the temperature detected by said detecting means exceeds a predetermined value or not so as to cause said discharging means to discharge the magnetooptical recording medium from said apparatus in order to prevent information recorded on the magnetooptical recording medium from disappearing when it is judged that the detected temperature exceeds the predetermined value.

2. An apparatus according to claim 1, wherein said detecting means comprises a thermistor.

3. An apparatus according to claim 1, wherein said discharging means comprises an ejecting mechanism used for ordinary medium discharge.

4. An apparatus according to claim 1, wherein when said control means judges that the temperature detected by said detecting means exceeds the predetermined value during the recording or reproducing operation, said control means controls said discharge means to immediately interrupt the recording or reproducing operation and discharge the magnetooptical recording medium from said apparatus.

5. An information processing apparatus for effecting a recording operation or an erasing operation for recording information on and/or erasing information from a magnetooptical recording medium loaded in said apparatus, said apparatus comprising:

means for effecting recording of information on and/or erasure of information from the magnetooptical recording medium;

discharge means for discharging the magnetooptical recording medium from said apparatus;

detecting means for detecting a temperature in a vicinity of the magnetooptical recording medium; and control means for judging whether the temperature detected by said detecting means exceeds a predetermined elevated temperature lower than a temperature at which information recorded on the magnetooptical recording medium is destroyed, and for controlling said discharge means so as to cause said discharge means to discharge the magnetooptical recording medium from said apparatus in order to prevent information recorded on the magnetooptical recording medium from disappearing when said control means judges that the detected temperature exceeds the predetermined elevated temperature except during the recording or erasing operation or within a predetermined time period after completion of the recording or erasing operation, the predetermined time period being set to accommodate proper completion of the recording or erasing operation.

6. An apparatus according to claim 5, further comprising abnormality detecting means for detecting an abnormality of a tracking and/or focusing servo during the recording or erasing operation, wherein when said abnormality detecting means detects an abnormality, said control means prohibits the discharge of the magnetooptical recording medium from said apparatus until a predetermined period of time has passed after detecting the abnormality even when it is judged that the detected temperature exceeds the predetermined elevated temperature.

7. An apparatus according to claim 5, wherein said detecting means comprises a thermistor.

8. An apparatus according to claim 5, wherein said discharging means comprises an ejecting mechanism used for ordinary discharge of the magnetooptical recording medium.

9. An information processing method for effecting a recording or reproducing operation for recording information on and/or reproducing information from a magnetooptical recording medium loaded in an information processing apparatus, said method comprising the steps of:

detecting a temperature in a vicinity of the magnetooptical recording medium;

judging whether the temperature detected in said detecting step exceeds a predetermined value or not; and discharging the magnetooptical recording medium from the apparatus so as to prevent information recorded on the magnetooptical recording medium from disappearing when it is judged in said judging step that the temperature detected in said detecting step exceeds the predetermined value.

10. An information processing method for effecting a recording or reproducing operation for recording information on and/or reproducing information from a magnetooptical recording medium loaded in an information processing apparatus, said method comprising the steps of:

detecting a temperature in a vicinity of the magnetooptical recording medium;

judging whether the temperature detected in said detecting step exceeds a predetermined value or not; and immediately interrupting recording or reproducing when it is judged in said judging step that the detected temperature exceeds the predetermined value during the recording or reproducing operation and discharging the magnetooptical recording medium from the apparatus so as to prevent information recorded on the magnetooptical recording medium from disappearing.

11. An information processing method for effecting a recording or reproducing operation for recording information on and/or reproducing information from a magnetooptical recording medium loaded in an information processing apparatus, said method comprising the steps of:

detecting a temperature in a vicinity of the magnetooptical recording medium;

judging whether the temperature detected in said detecting step exceeds a predetermined elevated temperature lower than a temperature at which information recorded on the magnetooptical recording medium is destroyed; and discharging the magnetooptical recording medium from the apparatus after completion of the recording or reproducing operation so as to prevent information recorded on the magnetooptical recording medium from disappearing when it is judged in said judging step that the detected temperature exceeds the predetermined elevated temperature during the recording or reproducing operation.

12. An information processing method for effecting a recording or erasing operation for recording information on and/or erasing information from a magnetooptical recording medium loaded in an information processing apparatus, said method comprising the steps of:

effecting recording of information on and/or erasure of information from the magnetooptical recording medium;

detecting a temperature in a vicinity of the magnetooptical recording medium;

judging whether the temperature detected in said detecting step exceeds a predetermined elevated temperature lower than a temperature at which information recorded on the magnetooptical recording medium is destroyed;

discharging the magnetooptical recording medium from the apparatus so as to prevent information recorded on the magnetooptical recording medium from disappearing when it is judged in said judging step that the detected temperature exceeds the predetermined elevated temperature; and prohibiting discharge of the magnetooptical recording medium from the apparatus during the recording or erasing operation or within a predetermined time period after completion of the recording or erasing operation even when it is judged in said judging step that the detected temperature exceeds the predetermined elevated temperature, the predetermined time period being set to accommodate proper completion of the recording or erasing operation.

13. An information processing apparatus for effecting a recording operation or a reproducing operation for recording information on and/or reproducing information from a magnetooptical recording medium loaded in said apparatus, said apparatus comprising:

discharging means for discharging the magnetooptical recording medium from said apparatus;

detecting means for detecting a temperature in a vicinity of the magnetooptical recording medium when the magnetooptical recording medium is loaded in the apparatus; and control means for controlling said discharging means by judging whether or not the temperature detected by said detecting means exceeds a predetermined elevated temperature lower than a temperature at which information recorded on the magnetooptical recording medium is destroyed; so as to cause said discharging means to discharge the magnetooptical recording medium from said apparatus after the judgement in order to prevent information recorded on the magnetooptical recording medium from disappearing when it is judged that the detected temperature exceeds the predetermined elevated temperature but before reaching the temperature at which information recorded on the magnetooptical recording medium is destroyed.

14. An information processing method for effecting a recording operation or a reproducing operation for recording information on or reproducing information from a magnetooptical recording medium loaded in an apparatus, said method comprising the steps of:

detecting a temperature in a vicinity of the magnetooptical recording medium when the magnetooptical recording medium is loaded in the apparatus;

judging whether the temperature detected in said detecting step exceeds a predetermined elevated temperature but before reaching the temperature at which information recorded on the magnetooptical recording medium is destroyed; and discharging the magnetooptical recording medium from the apparatus after the judgement in order to prevent information recorded on the magnetooptical recording medium from disappearing when it is judged in said judging step that the temperature detected in said detecting step exceeds the predetermined elevated temperature but before reaching the temperature at which information recorded on the magnetooptical recording medium is destroyed.

\* \* \* \* \*